United States Patent
Corten et al.

(10) Patent No.: US 10,208,148 B2
(45) Date of Patent: Feb. 19, 2019

(54) ADHESION PROMOTERS FOR AQUEOUS COATING COMPOSITIONS

(71) Applicant: BASF Coatings GmbH, Muenster (DE)

(72) Inventors: Cathrin Corten, Unna (DE); Audree Andersen, Havixbeck (DE); Markus Saedler, Muenster (DE); Stefanie Boshe-Plois, Ochtrup (DE); Frederik Foelling, Muenster (DE); Andrea Misske, Speyer (DE)

(73) Assignee: BASF Coatings GmbH, Muenster (DE)

( * ) Notice: Subject to any disclaimer, the term of this patent is extended or adjusted under 35 U.S.C. 154(b) by 99 days.

(21) Appl. No.: 15/312,415

(22) PCT Filed: Mar. 26, 2015

(86) PCT No.: PCT/EP2015/056555
§ 371 (c)(1),
(2) Date: Nov. 18, 2016

(87) PCT Pub. No.: WO2015/176854
PCT Pub. Date: Nov. 26, 2015

(65) Prior Publication Data
US 2017/0073446 A1    Mar. 16, 2017

(30) Foreign Application Priority Data

May 20, 2014   (EP) .................... 14169112

(51) Int. Cl.
| C09D 175/00 | (2006.01) |
| C08F 220/18 | (2006.01) |
| C08L 23/24 | (2006.01) |
| C08F 212/08 | (2006.01) |
| C09D 17/00 | (2006.01) |
| C09D 175/04 | (2006.01) |

(52) U.S. Cl.
CPC .......... *C08F 220/18* (2013.01); *C08F 212/08* (2013.01); *C08L 23/24* (2013.01); *C09D 17/001* (2013.01); *C09D 175/04* (2013.01); *C08F 2220/1825* (2013.01); *C08F 2800/20* (2013.01)

(58) Field of Classification Search
CPC .......... C08F 26/00; C08F 20/10; C08F 20/18; C09D 175/00; C09D 175/04
See application file for complete search history.

(56) References Cited

U.S. PATENT DOCUMENTS

2011/0218295 A1    9/2011   Nguyen Kim et al.

FOREIGN PATENT DOCUMENTS

| EP | 0 562 329 A1 | 9/1993 | |
| JP | 2003-515630 A | 5/2003 | |
| JP | 2013-53191 A  * | 3/2013 | ........... C09D 133/14 |
| JP | 2013-053191 A | 3/2013 | |

OTHER PUBLICATIONS

International Search Report and Written Opinion dated Sep. 15, 2015 in PCT/EP2015/056555 filed Mar. 26, 2015 (with English translation).
International Preliminary Report on Patentability and Written Opinion dated Nov. 22, 2016 in PCT/EP2015/056555 filed Mar. 26, 2015.

* cited by examiner

*Primary Examiner* — Rip A Lee
(74) *Attorney, Agent, or Firm* — Oblon, McClelland, Maier & Neustadt, L.L.P.

(57) ABSTRACT

The present invention relates to a copolymer obtainable by copolymerization of at least three ethylenically unsaturated monomers each different from one another, the copolymer having at least three structural units (S1) and (S2) and (S3) different from one another, to the use of this copolymer as an adhesion-promoting additive in an aqueous coating composition, to an aqueous coating composition comprising at least one polymeric resin (A1), at least one pigment (B), and at least one copolymer of the invention, used as adhesion-promoting additive, as component (C), and also to methods for at least partly coating a substrate with a basecoat and for at least partly coating a substrate with a multicoat paint system.

20 Claims, No Drawings

ADHESION PROMOTERS FOR AQUEOUS COATING COMPOSITIONS

The present invention relates to a copolymer obtainable by copolymerization of at least three ethylenically unsaturated monomers each different from one another, the copolymer having at least three structural units (S1) and (S2) and (S3) different from one another, to the use of this copolymer as an adhesion-promoting additive in an aqueous coating composition, to an aqueous coating composition comprising at least one polymeric resin (A1), at least one pigment (B), and at least one copolymer of the invention, used as adhesion-promoting additive, as component (C), and also to methods for at least partly coating a substrate with a basecoat and for at least partly coating a substrate with a multicoat paint system.

Plastics have pervaded vehicle finishing as materials for vehicle parts, components for mounting in or on vehicles, and vehicle accessory parts, both in the interior and on the exterior. For decorative reasons (coloring, for example) and/or for technical purposes (light stability and weather resistance, for example), plastics, like other materials, are coated with corresponding, suitable coating compositions and are thereby finished. An important requirement for a high-quality coating is its adhesion to the substrate or to the underlying coat, more particularly to the underlying substrate surface. There is widespread awareness that major problems of adhesion to the plastics substrate may occur especially in the coating or finishing of plastics. In order to achieve acceptable substrate adhesion for the coating in question, such plastics are typically subjected to a surface-activating pretreatment. The techniques most commonly employed are flaming, plasma treatment, and corona discharge.

Improving adhesion by using adhesion-promoting or adhesion-boosting compounds is also known, these compounds being, in particular, chlorinated polyolefins. From an environmental standpoint, however, the use of such chlorinated polyolefins is highly objectionable and therefore disadvantageous.

Adhesion-promoting compounds of this kind are typically employed by application to the plastics substrate of a primer coat which comprises the adhesion-promoting compounds (adhesion primer) in a separate coating operation prior to the coating proper. When aqueous coating compositions are used to coat plastics substrates, such compositions becoming evermore pervasive in the coating of plastics as well, for environmental reasons, the problems of adhesion between plastics substrate and coating are typically particularly pronounced.

Especially problematic is the coating of polyolefins such as polyethylene and polypropylene, polypropylene modified with ethylene-propylene-diene copolymers (PP-EPDM) or polypropylene modified with ethylene-butylene-diene copolymers (PP-EBDM), and polycarbonate modified with polybutadiene terephthalate (PC-PBT), and polyurethane (PUR-RIM), as plastics substrates to be coated. Substrates composed of or based on PP-EPDM, in particular, can typically be coated only after pretreatment of the substrate surface by flaming and after subsequent application of an adhesion primer to the substrate surface thus pretreated.

A disadvantage of this conventional procedure is that therefore—especially in the case of substrates composed of or based on PP-EPDM—it is necessary to apply an adhesion primer to the substrate surface and/or to carry out pretreatment before the coating proper whose objective is to obtain the decorative and/or technical effect. This necessitates a separate process step in each case—but this is undesirable on economic grounds, particularly on account of a higher expenditure in terms of time and money.

There is therefore a need for an aqueous coating composition which is suitable for producing a basecoat on the surface of a substrate, more particularly a plastics substrate, and which also permits effective adhesion of the basecoat to the underlying substrate surface and optionally, moreover, to any further, overlying coat such as a clearcoat, without coating of the substrate with an adhesion primer beforehand and/or without pretreatment of the substrate, and which, furthermore, is at least equally suitable for obtaining the desired decorative and/or technical effect that can also be obtained with conventional coating compositions. There is a need, furthermore, for coating compositions which remove the need to use chlorinated polyolefins as adhesion-promoting compounds.

It is an object of the present invention, therefore, to provide a coating composition for at least partly coating a substrate, preferably a substrate composed of or based on at least one plastic such as PP-EPDM, for example, with a basecoat, that has advantages over the coating compositions known from the prior art. More particularly it is an object of the present invention to provide a coating composition of this kind that permits a more environmental and economical coating method than do conventional coating compositions employed—that is, which makes it possible in particular to do without the use of solvent-based coating compositions, but which is nevertheless able to obtain at least the same, and more particularly an improved, adhesion to the underlying substrate surface and also, optionally, to any further, overlying coat, but without the need for prior coating of the substrate with an adhesion primer and/or without the need to use chlorinated polyolefins as adhesion-promoting compounds and/or without the need for pretreatment of the substrate.

This object is achieved by the subject matter claimed in the patent claims, and also by the preferred embodiments of said subject matter that are described in the description hereinafter.

A first subject of the present invention is therefore a copolymer obtainable by copolymerization of at least three ethylenically unsaturated monomers each different from one another, wherein
the copolymer has at least three structural units (S1) and (S2) and (S3) each different from one another, and
each structural unit (S1) has at least one branched alkyl group having at least 11, preferably at least 13, carbon atoms,
each structural unit (S2) has at least one urea group bonded via a $C_{1-10}$ alkylene group, of the general formula (I)

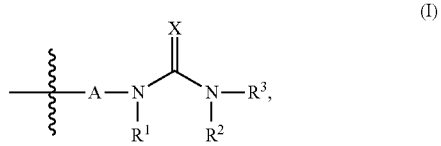

in which
X is O or S, preferably O,
A is a $C_{1-10}$ alkylene group, and
$R^1$, $R^2$ and $R^3$ each independently of one another are H or a $C_{1-10}$ alkyl radical, or
$R^1$ and $R^2$ together are $-(CR^4R^5)_n-$ and $R^3$ has one of the above definitions, where $R^4$ and $R^5$ each independently of one another are H or a $C_{1-6}$ alkyl radical, and the parameter n stands for an integer in the range from 2 to 5, preferably for 2 or 3, and each structural unit (S3) has at least one functional group selected from the group consisting of carboxyl groups, hydroxyl groups, thiol groups, amino groups, and epoxide groups, and mixtures thereof, preferably selected from the group consisting of carboxyl groups and hydroxyl groups and mixtures thereof.

A further subject of the present invention is a use of this inventive copolymer as an adhesion-promoting additive in an aqueous coating composition suitable for at least partly coating a substrate, preferably a substrate composed of or based on at least one plastic, with a basecoat.

A further subject of the present invention is an aqueous coating composition comprising at least one polymeric resin (A1) and optionally at least one crosslinking agent (A2), at least one pigment (B), and at least one copolymer of the invention different from the polymeric resin (A1) and used as an adhesion-promoting additive as component (C), i.e., the copolymer of the invention obtainable by copolymerization of at least three ethylenically unsaturated monomers different from one another, wherein the copolymer has at least three structural units (S1) and (S2) and (S3) different from one another, and each structural unit (S1) has at least one branched alkyl group having at least 11, preferably at least 13, carbon atoms, each structural unit (S2) has at least one urea group bonded via a $C_{1-10}$ alkylene group, of the general formula (I)

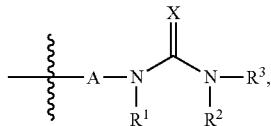

(I)

in which

X is O or S, preferably O,

A is a $C_{1-10}$ alkylene group, and $R^1$, $R^2$ and $R^3$ each independently of one another are H or a $C_{1-10}$ alkyl radical, or $R^1$ and $R^2$ together are —$(CR^4R^5)_n$— and $R^3$ has one of the above definitions, where $R^4$ and $R^5$ each independently of one another are H or a $C_{1-6}$ alkyl radical, and the parameter n stands for an integer in the range from 2 to 5, preferably for 2 or 3, and each structural unit (S3) has at least one functional group selected from the group consisting of carboxyl groups, hydroxyl groups, thiol groups, amino groups, and epoxide groups, and also mixtures thereof, preferably selected from the group consisting of carboxyl groups and hydroxyl groups and also mixtures thereof, for at least partly coating a substrate, preferably a substrate composed of or based on at least one plastic, with a basecoat.

It has surprisingly been found that through the use of the copolymer of the invention and of the coating composition of the invention for producing a basecoat on a substrate surface, preferably a substrate composed of or based on at least one plastic, it is possible to achieve effective adhesion to the underlying substrate surface and, moreover, to any further, overlying coat such as a clearcoat, by virtue in particular of the presence of component (C) in the coating composition of the invention. Here it has surprisingly emerged that this effective adhesion can still be achieved even after the corresponding substrate coated with the coating composition of the invention and optionally with a clearcoat applied thereto has been subjected to particular exposures, more particularly to various climatic conditions such as weathering, and has been stored under these conditions for a defined duration, such as several months, for example. Even after such storage over several months, surprisingly, no significant deterioration in the adhesion properties could be observed. The storage stability of the substrates coated at least partly by means of the coating composition of the invention is therefore outstanding.

More particularly it has surprisingly been found that such effective adhesion can be achieved even without prior coating of the substrate with an adhesion primer, with use of the copolymer of the invention or of the coating composition of the invention having the overall effect of permitting a more economical coating procedure, since there is no need for the separate step of coating the substrate with an adhesion primer.

More particularly it has surprisingly been found that such effective adhesion is made possible even without the prior pretreatment of the substrate.

In a preferred embodiment, the term "comprising" in the sense of the present invention, in connection for example with the copolymer of the invention or with the aqueous coating composition of the invention, has the meaning of "consisting of". In this case, in this preferred embodiment, with regard to the aqueous coating composition of the invention, the coating composition of the invention may include not only the water, (A1), (B), and (C) components but also, optionally, at least one further optional component (D) and/or (A2) and/or organic solvents. All components may each be present in one of their preferred embodiments as specified below in the coating composition of the invention.

The fractions in weight % of the components present in the coating composition of the invention—water, (A1), (B), and (C), optionally further (D) and/or (A2) and/or organic solvents, add up preferably to 100 wt %, based on the total weight of the coating composition.

Substrate

Suitable substrates used in accordance with the invention include all substrates typically employed and known to the skilled person, but especially plastics substrates. "Plastics substrates" or "substrates of plastic" are preferably substrates composed of or based on at least one plastic. Plastics contemplated include all customary plastics known to the skilled person, more particularly polystyrene (PS), polyvinyl chloride (PVC), polyurethane (PU or PUR) or (PUR-RIM), glass fiber-reinforced unsaturated polyesters, polymethyl methacrylate (PMMA), polyphenylene sulfide (PPS), polyoxymethylene (POM), polyphenylene ether (PPE), polyphenylene oxide (PPO), polyurea, polybutadiene-terephthalate (PBT), polycarbonate (PC), polycarbonate (PC) modified with polybutadiene terephthalate (PC-PBT), acrylonitrile-butadiene-styrene copolymers (ABS), polyolefins such as polyethylenes (PE) and polypropylene (PP) and also polyolefins such as, for example, polypropylene (PP), modified with ethylene-propylene-diene copolymers (EPDM) or with ethylene-butylene-diene copolymers (EBDM). Also possible here are plastics substrates which include different plastics from among those stated, in other words mixtures of these plastics. Particularly preferred plastics are polypropylene (PP) and polypropylene (PP) modified with ethylene-propylene-diene copolymers (EPDM). The modification of PP with EPDM is aimed essentially at elastifying the plastic, and may influence factors including the paintability of the plastic. At low EPDM fractions, the paintability or the adhesion of the finish on the substrate is often poorer than at higher fractions of EPDM. EPDM fractions of at least 20 wt % are advantageous, such as from 20 to 25 wt %, for example, based on the total weight of the plastic such as polypropylene and EPDM. The aqueous coating composition of the invention is suitable especially for the painting of polypropylene/EPDM plastics with low EPDM fractions of, for example, not greater than 25 wt %, more particularly not greater than 20 wt %.

The substrate used preferably has no primer coat, more particularly no adhesion primer coat—in other words, the coating composition of the invention is applied directly to the substrate surface of the substrate employed.

The substrate employed in accordance with the invention may be a pretreated substrate. Possible pretreatments in this case include flaming, plasma treatment, and corona discharge, more particularly flaming. Preferably, however, the substrate employed in accordance with the invention is an unpretreated, i.e., untreated, substrate.

The substrates employed in accordance with the invention may be plastics sheets. Also possible as substrates, however, are vehicle bodies made of plastics, or certain vehicle parts and also components for installation in or on vehicles, and vehicle accessory parts, both for the vehicle interior and for the vehicle exterior.

COPOLYMER OF THE INVENTION

The copolymer of the invention is obtainable by copolymerization of at least three ethylenically unsaturated monomers each different from one another, and has at least three structural units (S1) and (S2) and (S3) which are different from one another. It is possible, however, for further monomers to be employed as well to synthesize the copolymer; in other words, the copolymer may have not only (S1) and (S2) and (S3) but also further structural units, such as structural units (S4), for example.

The skilled person is aware of the term "ethylenically unsaturated monomers". Such monomers have at least one, preferably precisely one, ethylenically unsaturated group, i.e., at least one unsaturated carbon-carbon double bond. Examples of ethylenically unsaturated groups are vinyl groups, allyl groups and/or (meth)acryloyl groups. The copolymer of the invention itself preferably no longer has any ethylenically unsaturated groups.

Preferably the main polymer chain of the copolymer of the invention is synthesized by the copolymerization. Accordingly the at least one branched alkyl group having at least 11, preferably at least 13, carbon atoms, the at least one urea group bonded via a $C_{1-10}$ alkylene group, of the general formula (I), and the at least one functional group selected from the group consisting of carboxyl groups, hydroxyl groups, thiol groups, amino groups, and epoxide groups, and also mixtures thereof, are located preferably in the side chains or side groups and not in the main chain of the copolymer of the invention. The copolymer of the invention may have a linear, comb, star, or branched construction. The distribution of the at least three structural units, (S1), (S2), and (S3) may be either random or structured. Where there is a structured distribution, the at least three structural units (S1), (S2), and (S3) have a gradientlike or blocklike distribution. Gradientlike copolymers of the invention are preferably copolymers whose main polymer chain is formed by copolymerization of the at least three ethylenically unsaturated monomers different from one another, and for which the concentration of at least one of these structural units decreases continuously along the main polymer chain, and the concentration of the remaining structural unit or units increases. Blocklike copolymers of the invention (block copolymers) are preferably copolymers whose main polymer chain is formed by addition of at least two ethylenically unsaturated monomers each at different moments during a controlled polymerization reaction for preparing the copolymer of the invention. The structural units (S1) and (S2) and (S3) are preferably in each case repeating units.

Copolymer of the invention preferably has a weight-average molecular weight of 1000 to 100 000 g/mol, more preferably of 3000 to 80 000 g/mol, very preferably of 5000 to 60 000 g/mol, more particularly of 7000 to 55 000 g/mol or from 7500 to 50 000 g/mol, more preferably still of 10 000 to 40 000 g/mol, most preferably of 10 000 to 30 000 g/mol. The method for determining the weight-average molecular weight is described hereinafter.

The copolymer of the invention preferably has a number-average molecular weight of 100 to 50 000 g/mol, more preferably of 500 to 40 000 g/mol, very preferably of 1000 to 25 000 g/mol, more particularly of 2000 to 20 000 g/mol, even more preferably of 3000 to 15 000 g/mol, most preferably of 3500 to 10 000 g/mol. The method of determination for ascertaining the number-average molecular weight is described hereinafter.

The copolymer of the invention preferably has functional COOH groups through incorporation of the structural unit (S3). The copolymer of the invention preferably has an acid number of 5 to 200, more preferably of 7.5 to 150, very preferably of 10 to 100, more particularly of 12.5 to 50 or of 15 to 40, most preferably of 15 to 30, mg of KOH per g of copolymer. The method of determination for ascertaining the acid number is described hereinafter.

The copolymer of the invention preferably has functional OH groups through incorporation of the structural unit (S3). The copolymer of the invention preferably has an OH number (hydroxyl number) of 5 to 100, more preferably of 10 to 90, very preferably of 20 to 80, more particularly of 30 to 70 or of 40 to 60, mg of KOH per g of copolymer. The method of determination for ascertaining the hydroxyl number is described hereinafter.

The structural units (S1), (S2), and (S3) are preferably introduced into the copolymer by copolymerization of monomers which in each case independently of one another have at least one (meth)acryloyl group as ethylenically unsaturated group.

The expressions "(meth)acryloyl" and "(meth)acrylate" in the sense of the present invention encompass in each case the definitions "methacryloyl" and/or "acryloyl" and "methacrylate" and/or "acrylate", respectively.

Each structural unit (S1) has at least one branched alkyl group having at least 11, preferably at least 12, very preferably at least 13, more preferably at least 14, more particularly at least 15 or 16, most preferably at least 17, carbon atoms. The structural unit (S1) is preferably the only structural unit of the copolymer which has at least one such branched alkyl group having at least 11 carbon atoms. It is essential to the invention that the alkyl group having at least 11 carbon atoms is branched, since with a corresponding linear (unbranched) group it is impossible to achieve sufficient adhesion when using the copolymer of the invention as an adhesion-promoting additive.

The structural unit (S1) is incorporated into the copolymer of the invention using preferably corresponding ethylenically unsaturated monomers which are capable of the incorporation of the structural unit (S1). Examples of such monomers are those having, for example, a (meth)acrylate group to which a branched alkyl radical having at least 11, more particularly at least 13, carbon atoms is bonded. Such monomers, as for example a (meth)acrylate of this kind with a branched $C_{17}$ alkyl radical, are available commercially.

The copolymer of the invention may have different structural units (S1): for example, the copolymer of the invention may have at least one structural unit (S1) which has a branched alkyl group having at least carbon atoms, and at least one further structural unit (S1) which has a branched alkyl group having at least 17 carbon atoms.

The copolymer of the invention is preferably prepared using (s1) at least one ethylenically unsaturated monomer capable of forming the structural unit (S1), in an amount in a range from 0.5 to 15 mol %, more preferably from 0.6 to 12.5 mol %, very preferably from 0.7 to 10 mol %, more preferably still from 0.8 to 7.5 mol %, especially preferably from 0.9 to 5 mol %, most preferably from 1.0 to 4 mol % or from 1.0 to 3 mol %, based in each case on the total amount in mol % of all monomers used for preparing the copolymer, the total amount of all monomers used for preparing the copolymer adding up in total to 100 mol %.

Each structural unit (S2) has at least one urea group bonded via a $C_{1-10}$ alkylene group, preferably $C_{1-6}$ alkylene group, of the general formula (I),

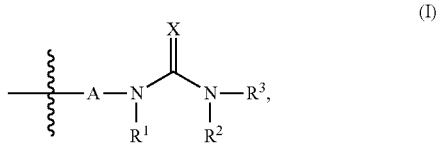

(I)

in which

X is O or S, preferably O,

A is a $C_{1-10}$ alkylene group, preferably $C_{1-6}$ alkylene group, and $R^1$, $R^2$ and $R^3$ each independently of one another are H or a $C_{1-10}$ alkyl radical such as a $C_{1-6}$ alkyl radical, or $R^1$ and $R^2$ together are —$(CR^4R^5)_n$— and $R^3$ has one of the above definitions, and $R^4$ and $R^5$ each independently of one another are H or a $C_{1-6}$ alkyl radical, and the parameter n stands for an integer in the range from 2 to 5, preferably for 2 or 3, preferably $R^1$ and $R^2$ together are —$(CR^4R^5)_n$— and $R^3$ is H or a $C_{1-6}$ alkyl radical, and $R^4$ and $R^5$ each independently of one another are H or a $C_{1-6}$ alkyl radical, and the parameter n stands for an integer in the range from 2 to 5, preferably for 2 or 3.

In the context of the present invention, the symbol

used in the formulae such as the general formula (I) identifies the linkage of the radical in question to the respective superordinate general structure—in other words, for example, the linkage of the radical -A-N($R^1$)—C(=X)—N($R^2$)($R^3$) to the copolymer framework and more particularly to the main polymer chain. Where, for example, ureidomethyl (meth)acrylate is used as monomer, the variable A is bonded to the polymer main chain via a —O—C(=O) group. If (meth)acryloylamidoethylethyleneurea, for example, is used as monomer, then the variable A is bonded to the main polymer chain via an —NH—C(=O) group.

The structural unit (S2) is preferably the only structural unit of the copolymer that has at least one such urea group of the general formula (I).

The structural unit (S2) is incorporated into the copolymer of the invention using preferably corresponding ethylenically unsaturated monomers which are capable of the incorporation of the structural unit (S2). Examples thereof are ureidomethyl (meth)acrylate and/or (meth)acryloylamidoethylethyleneurea, both of which are available commercially.

The copolymer of the invention is preferably prepared using (s2) at least one ethylenically unsaturated monomer capable of forming the structural unit (S2), in an amount in a range from 0.5 to 15 mol %, more preferably from 0.75 to 12.5 mol %, very preferably from 1.0 to 10 mol %, more preferably still from 1.25 to 7.5 mol %, especially preferably from 1.5 to 5 mol %, most preferably from 1.75 to 4 mol %, based in each case on the total amount in mol % of all monomers used for preparing the copolymer, the total amount of all monomers used for preparing the copolymer adding up in total to 100 mol %.

The copolymer of the invention may have different structural units (S2): for example, the copolymer of the invention may have at least one structural unit (S2) in which X=O, $R^1$ and $R^2$ together are —$(CR^4R^5)_n$—, $R^3$ is H, and $R^4$ and $R^5$ each independently of one another are H, and the parameter n stands for 2, and a further structural unit (S2) in which X=O, $R^1$ and $R^2$ together are —$(CR^4R^5)_n$—, $R^3$ is H, and $R^4$ and $R^5$ each independently of one another are H, and the parameter n stands for 3.

Each structural unit (S3) has at least one functional group selected from the group consisting of carboxyl groups, hydroxyl groups, thiol groups, amino groups, including primary and secondary amino groups, and epoxide groups, and also mixtures thereof, preferably selected from the group consisting of carboxyl groups and hydroxyl groups, and also mixtures thereof. The structural unit (S3) is preferably the only structural unit of the copolymer which has at least one of the aforementioned functional groups.

The copolymer of the invention may have different structural units (S3): for example, the copolymer of the invention may have at least one structural unit (S3) which has at least one carboxyl group, and at least one further structural unit (S3) which has at least one hydroxyl group.

The structural unit (S3) is incorporated into the copolymer of the invention using preferably corresponding ethylenically unsaturated monomers which are capable of incorporating the structural unit (S3). Examples thereof are OH-functional ethylenically unsaturated monomers such as alkyl (meth)acrylates, where the alkyl radicals of these (meth)acrylates each have at least one OH group or at least one protected OH group, more particularly selected from the group consisting of hydroxyethyl (meth)acrylate, hydroxypropyl (meth)acrylate, and hydroxybutyl (meth)acrylate. Also suitable, for example, are allyl alcohol, vinyl alcohol, hydroxyalkyl vinyl ethers, and hydroxyalkyl allyl ethers. An example of a COOH-functional ethylenically unsaturated monomer which can be used to form the structural unit (S3) is (meth)acrylic acid.

The copolymer of the invention is preferably prepared using (s3) at least one ethylenically unsaturated monomer capable of forming the structural unit (S3), in an amount in a range from 5 to 50 mol %, more preferably from 7.5 to 45 mol %, very preferably from 10.0 to 40 mol %, more preferably still from 12.5 to 35 mol %, especially preferably from 15 to 30 mol %, most preferably from 15 to 25 mol %, based in each case on the total amount in mol % of all monomers used for preparing the copolymer, the total amount of all monomers used for preparing the copolymer adding up in total to 100 mol %.

Preferably each structural unit (S1) has at least one branched alkyl group having at least 13 carbon atoms, each structural unit (S2) has at least one urea group bonded via a $C_{1-6}$ alkylene group, of the general formula (I),

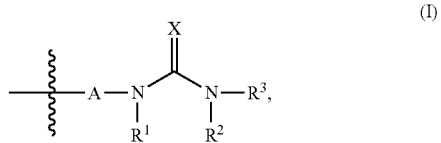

in which

X is O or S, preferably O,

A is a $C_{1-6}$ alkylene group, and $R^1$, $R^2$ and $R^3$ each independently of one another are H or a $C_{1-6}$ alkyl radical, or $R^1$ and $R^2$ together are —$(CR^4R^5)_n$— and $R^3$ has one of the above definitions, and $R^4$ and $R^5$ each independently of one another are H or a $C_{1-6}$ alkyl radical, and the parameter n stands for an integer in the range from 2 to 5, preferably for 2 or 3, preferably $R^1$ and $R^2$ together are —$(CR^4R^5)_n$— and $R^3$ is H or a $C_{1-6}$ alkyl radical, and $R^4$ and $R^5$ each independently of one another are H or a $C_{1-6}$ alkyl radical, and the parameter n stands for an integer in the range from 2 to 5, preferably for 2 or 3, and each structural unit (S3) present has at least one functional group selected from the group consisting of carboxyl groups and hydroxyl groups, and also mixtures thereof.

The copolymer of the invention preferably has at least one further structural unit (S4) different from (S1) and (S2) and also from (S3), with each structural unit (S4) having at least one group selected from the group consisting of branched and unbranched $C_{1-10}$ alkyl groups, $C_{3-10}$ cycloalkyl groups optionally substituted by at least one $C_{1-6}$ alkyl group, aromatic groups optionally substituted by at least one $C_{1-6}$ alkyl group, aromatic groups bonded via a $C_{1-6}$ alkylene group and optionally substituted by at least one $C_{1-6}$ alkyl group, and $C_{3-10}$ cycloalkyl groups bonded via a $C_{1-6}$ alkylene group and optionally substituted by at least one $C_{1-6}$ alkyl group.

The structural unit (S4) is incorporated into the copolymer of the invention using preferably corresponding ethylenically unsaturated monomers which are capable of incorporating the structural unit (S4). Examples thereof are ethylenically unsaturated monomers which have at least one group selected from the group consisting of (s4a) branched and unbranched $C_{1-10}$ alkyl groups, (s4b) $C_{3-10}$ cycloalkyl groups optionally substituted by at least one $C_{1-6}$ alkyl group, (s4c) aromatic groups optionally substituted by at least one $C_{1-6}$ alkyl group and having, for example, 6 to 16 carbon atoms, (s4d) aromatic groups bonded via a $C_{1-6}$ alkylene group and being optionally substituted by at least one $C_{1-6}$ alkyl group and having, for example 6 to 16 carbon atoms, and (s4e) $C_{3-10}$ cycloalkyl groups bonded via a $C_{1-6}$ alkylene group and being optionally substituted by at least one $C_{1-6}$ alkyl group.

Examples of monomers (s4a) are alkyl (meth)acrylates such as, for example, methyl (meth)acrylate, ethyl (meth)acrylate, n-butyl (meth)acrylate, isobutyl (meth)acrylate, tert-butyl (meth)acrylate, lauryl (meth)acrylate, 2-ethylhexyl (meth)acrylate, and stearyl (meth)acrylate. Examples of monomers (s4b) are cycloalkyl (meth)acrylates such as, for example, cyclohexyl (meth)acrylate or isobornyl (meth)acrylate. Examples of monomers (s4c) are aryl (meth)acrylates such as, for example, phenyl (meth)acrylate or other ethylenically unsaturated monomers such as styrene. Examples of monomers (s4d) are alkylaryl (meth)acrylates, such as, for example, benzyl (meth)acrylate.

The copolymer of the invention is preferably prepared using (s4) at least one ethylenically unsaturated monomer capable of forming the structural unit (S4), in an amount in a range from 20 to 90 mol %, more preferably from 25 to 90 mol %, very preferably from 30 to 87.5 mol %, more preferably still from 35 to 85 mol %, especially preferably from 40 to 82.5 mol %, most preferably from 45 to 80 mol % or from 50 to 80 mol % or from 60 to 80 mol %, based in each case on the total amount in mol % of all monomers used for preparing the copolymer, the total amount of all monomers used for preparing the copolymer adding up in total to 100 mol %.

The copolymerization may be initiated using at least one initiator such as tert-butyl peroxy-2-ethyl-hexanoate, for example. The copolymerization takes place preferably in an organic solvent such as, for example, methyl ethyl ketone (MEK) and/or methyl isobutyl ketone (MIBK). The copolymerization is accomplished preferably by radical, cationic, or anionic means. Particularly preferred is a radical polymerization for preparing the copolymer of the invention. For the preparation it is possible to use living or controlled polymerization processes, as for example controlled radical polymerization processes or a group transfer polymerization.

The copolymer of the invention is preferably obtainable by radical copolymerization of (s1) at least one ethylenically unsaturated monomer capable of forming the structural unit (S1), in an amount in a range from 0.5 to 15 mol %, more preferably from 0.6 to 12.5 mol %, very preferably from 0.7 to 10 mol %, more preferably still from 0.8 to 7.5 mol %, especially preferably from 0.9 to 5 mol %, most preferably from 1.0 to 4 mol % or from 1.0 to 3 mol %, based in each case on the total amount in mol % of all monomers used for preparing the copolymer, (s2) at least one ethylenically unsaturated monomer capable of forming the structural unit (S2), in an amount in a range from 0.5 to 15 mol %, more preferably from 0.75 to 12.5 mol %, very preferably from 1.0 to 10 mol %, more preferably still from 1.25 to 7.5 mol %, especially preferably from 1.5 to 5 mol %, most preferably from 1.75 to 4 mol %, based in each case on the total amount in mol % of all monomers used for preparing the copolymer, (s3) at least one ethylenically unsaturated monomer capable of forming the structural unit (S3), in an amount in a range from 5 to 50 mol %, more preferably from 7.5 to 45 mol %, very preferably from 10.0 to 40 mol %, more preferably still from 12.5 to 35 mol %, especially preferably from 15 to 30 mol %, most preferably from 15 to 25 mol %, based in each case on the total amount in mol % of all monomers used for preparing the copolymer, and (s4) optionally at least one ethylenically unsaturated monomer capable of forming the structural unit (S4), in an amount in a range from 20 to 90 mol %, more preferably from 25 to 90 mol %, very preferably from 30 to 87.5 mol %, more preferably still from 35 to 85 mol %, especially preferably from 40 to 82.5 mol %, most preferably from 45 to 80 mol % or from 50 to 80 mol % or from 60 to 80 mol %, based in each case on the total amount in mol % of all monomers used for preparing the copolymer, with the total amount of all monomers (s1), (s2), (s3) and (s4) used for preparing the copolymer adding up in total to 100 mol %.

Use of the Copolymer of the Invention as an Adhesion-promoting Additive in Aqueous Coating Compositions A further subject of the present invention is a use of the copolymer of the invention as an adhesion-promoting additive in an aqueous coating composition suitable for at least partly coating a substrate, preferably a substrate composed of or based on at least one plastic, with a basecoat.

A person of ordinary skill in the art is aware that the compatibility of an adhesion promoter, i.e., of an adhesion-promoting additive, in aqueous coating compositions must be such that it accumulates preferentially at the interfaces of a coat obtained using an aqueous coating composition, such as a basecoat, in order thus to be able to improve the adhesion to the adjacent coats and/or to the substrate. If the solubility of the adhesion promoter in water is too great, the stated accumulation at the interfaces preferentially does not occur, and there is no improvement in adhesion or promotion of adhesion.

All of the preferred embodiments described hereinabove in connection with the copolymer of the invention are also preferred embodiments in relation to the use of this copolymer as an adhesion-promoting additive in an aqueous coating composition.

Coating Composition

A further subject of the present invention is an aqueous coating composition comprising at least one polymeric resin (A1) and optionally at least one crosslinking agent (A2), at least one pigment (B), and at least one copolymer of the invention different from the polymeric resin (A1) and used inventively as an adhesion-promoting additive, as component (C).

All of the preferred embodiments described hereinabove in connection with the copolymer of the invention are also preferred embodiments in relation to the employment of this copolymer as component (C) in the aqueous coating composition of the invention.

The coating composition of the invention takes the form preferably of a dispersion or solution, more particularly a dispersion.

The aqueous coating composition of the invention comprises water as liquid diluent.

The term "aqueous" in connection with the coating composition of the invention comprehends preferably those coating compositions which comprise water as liquid diluents, in other words as liquid solvent and/or dispersion medium, more particularly dispersion medium. Optionally, however, the coating composition of the invention may further comprise at least one organic solvent. Examples of such organic solvents include heterocyclic, aliphatic, or aromatic hydrocarbons such as toluene, isophorone, xylene, solvent naphtha, Solvesso 100, Shellsol A, mono- or polyhydric alcohols such as ethylhexanol, butoxypropanol, isopropanol, butyl diglycol, methanol, ethanol, propanol, and butanol, ethers such as diethylene glycol dimethyl ether and dipropylene glycol methyl ether, ethyl glycol and butyl glycol, esters such as ethyl acetate, butyl acetate, pentyl acetate, or ethyl ethoxypropionate, ketones such as cyclohexanone, methyl ethyl ketone (MEK), methyl amyl ketone, methyl isobutyl ketone (MIBK), and acetone, and amides, such as N-methylpyrrolidone, N-ethylpyrrolidone, dimethyl-formamide, toluene, xylene, solvent naphtha, Solvesso 100, and Shellsol A, for example. Water-miscible organic solvents are used with preference. The fraction of these organic solvents is preferably not more than 25.0 wt %, more preferably not more than 20.0 wt %, very preferably not more than 15.0 wt %, more particularly not more than 10.0 wt % or not more than 5.0 wt %, based in each case on the total weight of the aqueous coating composition.

The term "aqueous" in the context of the present invention means more particularly that the coating composition of the invention contains preferably at least 10 wt %, more preferably at least 20 wt %, very preferably at least 25 wt % of water, based in each case on the total weight of the aqueous coating composition. With particular preference the term "aqueous" should be interpreted to mean that in addition to the stated condition of "at least 10 wt % (or at least 20 or 25 wt %) of water, based on the total weight of the aqueous coating composition", the fraction of organic solvents in the coating composition of the invention is less than 25 wt %, more particularly less than 20 wt %, based in each case on the total weight of the aqueous coating composition.

The coating composition of the invention serves for producing a basecoat on the substrate surface of a substrate such as a substrate composed of or based on at least one plastic.

The term "basecoat" or "basecoat film" is known to the skilled person and serves preferably as a designation for an intermediate, color-imparting coating in general industrial finishing, more particularly automobile finishing, which is applied at least partly to a substrate. This basecoat preferably forms the first coat of what is called a two-coat paint system. The second, topmost coat is preferably then a clearcoat, which protects the basecoat from weathering effects and also from mechanical and chemical effects.

The coating composition of the invention preferably has a solids fraction, i.e., a solids content, in the range from 10 to 50 wt %, more preferably in the range from 12.5 to 45 wt %, very preferably in the range from 15 to 40 wt %, especially preferably in the range from 17.5 to 35 wt % or from 20 to 30 wt %, based in each case on the total weight of the coating composition.

The skilled person is aware of methods of determination for ascertaining the solids fraction or solids content, i.e., the nonvolatile fractions. The solids content here is determined in accordance with the method described hereinafter.

The coating composition of the invention comprises at least one polymeric resin (A1) and optionally at least one crosslinking agent (A2). The polymeric resin (A1) is a polymeric resin different from the copolymer of the invention.

The at least one polymeric resin (A1), the crosslinking agent (A2) optionally present, and the copolymer (C) are binder components of the coating composition of the invention.

The term "binder" is understood within the meaning of the present invention, in line with DIN EN ISO 4618

(German version, date: March 2007), to refer preferably to the nonvolatile fractions of a coating composition, such as the coating composition of the invention, that are preferably responsible for film-forming. Pigments present therein, including pigment (B) and any fillers present, are therefore not subsumed by the term "binder". The nonvolatile fraction may be determined in accordance with the method described hereinafter. More particularly, the term "binder" is understood to refer to the polymeric resins (A1) that are responsible for film-forming and are present in the coating composition. The term "binder" also encompasses crosslinking agents that are present in the coating composition, such as component (A2), for example, the copolymer (C), and also any additives (D) that may be present and that fall within the definition of a binder.

The coating composition of the invention is prepared preferably using a dispersion or solution, more preferably at least one dispersion, which comprises the at least one polymeric resin (A1). For preparing the coating composition of the invention it is possible, furthermore, to use at least one dispersion or solution, more preferably at least one dispersion, of at least one crosslinking agent (A2), which is combined shortly before preparation of the coating composition with the solution or dispersion containing (A1) (2-component coating composition).

All customary polymeric resins known to the skilled person are suitable here as polymeric resin (A1) of the coating composition of the invention.

The at least one polymeric resin (A1) preferably has reactive functional groups which permit a crosslinking reaction. This polymeric resin (A1) is preferably an externally crosslinking polymeric resin. To permit a crosslinking reaction, the coating composition of the invention comprises at least one crosslinking agent (A2) as well as the at least one polymeric resin (A1). Alternatively, however, a self-crosslinking polymeric resin (A1) may also be used.

The polymeric resin (A1) present in the aqueous coating composition of the invention, and/or the at least one crosslinking agent (A2) that may optionally also be present, are preferably thermally crosslinkable. Alternatively or additionally, however, a radiation-curing crosslinking is also possible. These components are preferably crosslinkable on heating to a substrate temperature of or above room temperature, i.e., at a substrate temperature of or above 18-23° C. Preferably these components are crosslinkable only at substrate temperatures ≥40° C., more preferably ≥50° C., very preferably ≥60° C., and especially preferably ≥70° C.

Any customary crosslinkable reactive functional group known to the skilled person is contemplated as a crosslinkable reactive functional group of the polymeric resin (A1). The polymeric resin (A1) preferably has at least one kind of functional reactive groups selected from the group consisting of primary amino groups, secondary amino groups, hydroxyl groups, thiol groups, carboxyl groups, groups which have at least one C═C double bond, such as vinyl groups or (meth)acrylate groups, for example, and epoxide groups and also mixtures thereof. Preferred are hydroxyl groups, carboxyl groups and/or epoxide groups, more particularly hydroxyl groups.

The at least one polymeric resin (A1) is preferably selected from the group consisting of polyurethanes, polyesters, polyamide, polyureas, polystyrenes, polycarbonates, poly (meth)acrylates, vinyl ester-based resins, epoxy resins, and mixtures thereof, with preferably 70 to 100 wt % of the polymeric resin being selected from at least one of the aforementioned polymers. Among the stated polymers, reference is preferably in each case both to homopolymers and to corresponding copolymers.

With particular preference the at least one polymeric resin (A1) is selected from the group consisting of polyurethanes, polyesters, epoxy resins, and poly-(meth)acrylates which preferably each have functional hydroxyl groups, more particularly from polyurethanes, polyesters, and poly(meth)acrylates which preferably each have functional hydroxyl groups. Such polymeric resins are described in, for example, Römpp-Lexikon Lacke und Druckfarben, Georg Thieme Verlag, Stuttgart, N.Y., 1998, pages 73 to 74. The polymeric resins may be rendered dispersible in water by taking measures familiar to the skilled person. This may involve the ionic modification of the polymeric resins through introduction of monomers containing, for example, carboxylate groups or sulfonate groups. Another possibility is that of nonionic modification, using polyglycol ether chains, for example, or the additional employment of particular additives (D) such as dispersants, as for example emulsifiers.

The coating composition of the invention comprises the at least one polymeric resin (A1) preferably in an amount in a range from 5 to 40 wt %, more preferably in a range from 7.5 to 30 wt %, very preferably in a range from 10 to 25 wt %, based in each case on the total weight of the coating composition.

The coating composition of the invention optionally comprises at least one crosslinking agent as component (A2). The coating composition of the invention preferably comprises at least one crosslinking agent as component (A2).

The crosslinking agent (A2) is preferably suitable for thermal crosslinking or curing. Such crosslinking agents are known to the skilled person. To accelerate the crosslinking it is possible to add suitable catalysts to the aqueous coating composition.

All customary crosslinking agents (A2) known to the skilled person may be used for preparing the aqueous coating composition of the invention. Examples of suitable crosslinking agents are amino resins, polyamines, phenolic resins, polyfunctional Mannich bases, melamine resins, benzoguanamine resins, resins or compounds containing anhydride groups, resins or compounds containing epoxide groups, tris(alkoxy-carbonylamino)triazines, resins or compounds containing carbonate groups, blocked and/or nonblocked polyisocyanates, β-hydroxyalkylamides, and also compounds having on average at least two groups capable of transesterification, examples being reaction products of malonic diesters and polyisocyanates or of esters and partial esters of polyhydric alcohols of malonic acid with monoisocyanates. Where blocked polyisocyanates are selected as crosslinking agents, the aqueous coating composition used in accordance with the invention is formulated as a 1-component composition. Where nonblocked polyisocyanates are selected as crosslinking agents, the aqueous coating composition is formulated as a 2-component composition (2K).

One particularly preferred crosslinking agent (A2) is selected from the group consisting of blocked polyisocyanates and melamine resins such as melamine-formaldehyde condensation products, more particularly etherified (alkylated) melamine-formaldehyde condensation products.

Blocked polyisocyanates which can be utilized are any desired polyisocyanates such as, for example, diisocyanates in which the isocyanate groups have been reacted with a compound and so the blocked polyisocyanate formed is stable with respect to reactive functional groups such as hydroxyl groups, for example, at room temperature, i.e., at a temperature of 18 to 23° C., but reacts at elevated temperatures, as for example at ≥80° C., more preferably ≥110° C., very preferably ≥130° C., and especially preferably ≥140° C., or at 90° C. to 300° C. or at 100 to 250° C., more preferably at 125 to 250° C., and very preferably at 150 to 250° C. In preparing the blocked polyisocyanates it is possible to use any organic polyisocyanates suitable for crosslinking. Preferred polyisocyanates, as for example diisocyanates, that are used are (hetero)aliphatic, (hetero)cycloaliphatic, (hetero)aromatic, or (hetero)-aliphatic-(hetero) aromatic diisocyanates. Preferred diisocyanates contain 2 to 36, more particularly 6 to 15, carbon atoms. Preferred examples are ethylene 1,2-diisocyanate, tetramethylene 1,4-diisocyanate, hexamethylene 1,6-diisocyanate (HDI), 2,2,4-(2,4,4)-trimethylhexamethylene 1,6-diisocyanate (TMDI), 1,3-bis(1-isocyanato-1-methylethyl)benzene, diphenylmethane diisocyanate (MDI), 1,9-diisocyanato-5-methylnonane, 1,8-diisocyanato-2,4-dimethyloctane, dodecane 1,12-diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl(1,4-methanonaphthalen-2(or 3),5-ylenedimethylene diisocyanate, hexahydro-4,7-methanoindan-1(or 2),5 (or 6)-ylenedimethylene diisocyanate, hexahydro-4,7-methanoindan-1(or 2),5(or 6)-ylene diisocyanate, hexahydrotolylene 2,4- and/or 2,6-diisocyanate (H6-TDI), toluene 2,4- and/or 2,6-diisocyanate (TDI), perhydrodiphenylmethane 2,4'-diisocyanate, perhydrodiphenylmethane 4,4'-diisocyanate ($H_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, naphthylene diisocyanate, 2,5(2,6)-bis(isocyanatomethyl)bicyclo[2.2.1]heptane (NBDI), and also any mixtures of these compounds. Use may also be made of polyisocyanates with a higher isocyanate functionality. Examples thereof are trimerized hexamethylene diisocyanate and trimerized isophorone diisocyanate. Furthermore, mixtures of polyisocyanates may also be utilized. Especially preferred are toluene 2,4-diisocyanate and/or toluene 2,6-diisocyanate (TDI), and/or isomer mixtures of toluene 2,4-diisocyanate and toluene 2,6-diisocyanate, and/or diphenylmethane diisocyanate (MDI) and/or hexamethylene 1,6-diisocyanate (HDI). Especially preferred is HDI as the polyisocyanate used for preparing the polyurethane resin.

Likewise employable as suitable crosslinking agents (A2) are water-soluble or water-dispersible melamine resins, preferably melamine-formaldehyde condensation products, more particularly optionally etherified (alkylated such as $C_1$-$C_6$-alkylated, for example) melamine-formaldehyde condensation products. Their solubility in water or dispersibility in water is dependent—not only on the degree of condensation, which is to be as low as possible, but also—on the etherifying component, with only the lowest members of the alkanol or ethylene glycol monoether series producing water-soluble condensates. Particularly preferred are melamine resins etherified with at least one $C_{1-6}$ alcohol, preferably with at least one $C_{1-4}$ alcohol, more particularly with methanol (i.e., methylated), such as melamine-formaldehyde condensation products. When solubilizers are used as optional further additives, it is also possible for ethanol-, propanol- and/or butanol-etherified melamine resins, more particularly the corresponding etherified melamine-formaldehyde condensation products, to be dispersed or dissolved in aqueous phase.

In one preferred embodiment the crosslinking agent (A2) of the coating composition of the invention is at least one water-soluble or water-dispersible melamine resin, preferably at least one water-soluble or water-dispersible melamine-formaldehyde condensation product, more particularly at least one water-soluble or water-dispersible etherified (alkylated), preferably methylated melamine-formaldehyde condensation product.

The aqueous coating composition preferably comprises the crosslinking agent (A2) in an amount of 1 to 20 wt %, preferably in an amount of 2.5 to 15 wt %, more preferably in an amount of 3 to 10 wt %, based on the total weight of the aqueous coating composition.

The coating composition of the invention preferably comprises at least one polymeric resin (A1) selected from the group consisting of polyurethanes, polyesters, epoxy resins, and poly(meth)acrylates each having functional hydroxyl groups, and at least one optionally alkylated melamine-formaldehyde condensation product as optionally present crosslinking agent (A2).

The relative ratio by weight of the at least one polymeric resin (A1) to the optionally present at least one crosslinking agent (A2) in the coating composition of the invention is preferably in a range from 6:1 to 1:1, more preferably in a range from 4:1 to 1.1:1, very preferably in a range from 2.5:1 to 1.1:1, more particularly in a range from 2.2:1 to 1.1:1, based in each case on the solids fraction of the at least one polymeric resin (A1) and of the at least one crosslinking agent (A2) within the coating composition of the invention.

The selection and combination of suitable polymeric resins (A1) and of crosslinking agents optionally present are made in accordance with the desired and/or required properties of the coating system to be produced. A further criterion for selection are the desired and/or required curing conditions, more particularly the curing temperatures (crosslinking temperatures). The way in which such a selection is to be made is familiar to the person skilled in the art of coatings technology, who is able to adapt it accordingly. Possibilities here include the one-component and also two-component coating systems that are known per se (in this regard, see also Römpp-Lexikon Lacke und Druckfarben, Georg Thieme Verlag, Stuttgart, N.Y., 1998, pages 274-276, and pages 641-642). One-component systems are employed with preference.

Pigment (B) and Optionally Present Additive (D)

The coating composition of the invention comprises at least one pigment as component (B).

The term "pigment" is known to the skilled person, from DIN 55945 (date: October 2001), for example. A "pigment" within the meaning of the present invention refers preferably to compounds in powder or platelet form which are insoluble substantially, preferably completely, in the medium surrounding them, such as in the coating composition of the invention. Pigments differ from "fillers" preferably in their refractive index, which for pigments is ≥1.7.

A pigment of this kind is preferably selected from the group consisting of organic and inorganic, color-imparting and extender pigments. Examples of suitable inorganic color-imparting pigments are white pigments such as zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow, or bismuth vanadate. Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Examples of suitable extender pigments or fillers are chalk, calcium sulfate, barium sulfate, silicates such as talk or kaolin, silicas, oxides such as aluminum hydroxide, or magnesium hydroxide, or organic fillers such as textile fibers, cellulose fibers, polyethylene fibers, or polymer powders; for further details, refer to Römpp Lexikon Lacke und Druckfarben, Georg Thieme Verlag, 1998, pages 250 ff., "Fillers".

Effect pigments may also be used as pigments (B) present in the aqueous coating composition. A skilled person is familiar with the term "effect pigments". More particularly, effect pigments are those pigments which impart optical effect or both color and optical effect, more particularly optical effect. A corresponding subdivision of the pigments may be made according to DIN 55944 (date: December 2011). The effect pigments are preferably selected from the group consisting of organic and inorganic, optical effect, and color and optical effect pigments. They are preferably selected from the group consisting of organic and inorganic, optical effect, or color and optical effect pigments. More particularly the organic and inorganic, optical effect, and color and optical effect pigments are selected from the group consisting of optionally coated metallic effect pigments, optionally coated metal oxide effect pigments, of effect pigments composed of optionally coated metals and nonmetals, and optionally coated nonmetallic effect pigments. More particularly the optionally coated—such as silicate-coated, for example—metallic effect pigments are aluminum effect pigments, iron effect pigments, or copper effect pigments. Especially preferred are optionally coated—such as silicate-coated, for example—aluminum effect pigments, more particularly commercially available products from Eckart such as Stapa® Hydrolac, Stapa® Hydroxal, Stapa® Hydrolux, and Stapa® Hydrolan, most preferably Stapa® Hydrolux, and Stapa® Hydrolan. The effect pigments used in accordance with the invention, more particularly aluminum effect pigments which are optionally coated, such as silicate-coated, for example, can be used in any customary form known to the skilled person, such as, for example, a leaflet and/or platelet form, more particularly a (corn)flake form or a silver dollar form. In particular, the effect pigments made up of metals and nonmetals are platelet-shaped aluminum pigments coated with iron oxide, as described in European patent application EP 0 562 329 A2, for example; glass flakes coated with metals, especially with aluminum; or interference pigments which comprise a reflector layer made of metal, more particularly aluminum, and exhibit a strong color flop. The nonmetallic effect pigments are especially pearlescent pigments, more particularly mica pigments; platelet-shaped graphite pigments coated with metal oxides; interference pigments which contain no metal reflector layer and exhibit strong color flop; platelet-shaped effect pigments based on iron oxide, with a shade from pink to brownish red; or organic, liquid-crystalline effect pigments. For further details of the effect pigments used in accordance with the invention, refer to Römpp Lexikon Lacke und Druckfarben, Georg Thieme Verlag, 1998, pages 176, "Effect pigments" and pages 380 and 381, "Metal oxidemica pigments" to "Metal pigments".

The pigment content of the aqueous coating compositions of the invention in terms of pigment (B) may vary. The pigment content, based on the total weight of the aqueous coating composition of the invention, is preferably in the range from 0.1 to 50 wt %, more preferably in the range from 0.5 to 45 wt %, very preferably in the range from 1.0 to 40 wt %, especially preferably in the range from 2.0 to 35 wt %, and more particularly in the range from 3.0 to 25 wt %.

Depending on desired application, the coating composition of the invention may comprise one or more typically employed additives as component (D).

These additives (D) are preferably selected from the group consisting of antioxidants, antistats, wetting and dispersing agents, emulsifiers, flow control assistants, solubilizers, defoaming agents, wetting agents, stabilizing agents, preferably heat and/or thermal stabilizers, process stabilizers, and UV and/or light stabilizers, flame retardants, photoprotectants, deaerating agents, inhibitors such as polymerization inhibitors, catalysts, waxes, wetting and dispersing agents, flexibilizers, flame retardants, reactive diluents, rheological assistants, carrier media, waxes, hydrophobizing agents, hydrophilizing agents, thickeners, thixotropic agents, impact modifiers, expandants, process auxiliaries, plasticizers, fillers, glass fibers, and reinforcement agents, and mixtures of the aforementioned further additives. The additive content of the coating composition of the invention in terms of additive (D) may vary. The content, based on the total weight of the coating composition of the invention, is preferably 0.01 to 20.0 wt %, more preferably 0.05 to 18.0 wt %, very preferably 0.1 to 16.0 wt %, especially preferably 0.1 to 14.0 wt %, more particularly 0.1 to 12.0 wt %, and most preferably 0.1 to 10.0 wt %.

The term "filler" is known to the skilled person, from DIN 55945 (date: October 2001), for example. A "filler" within the meaning of the present invention refers preferably to a substance which is substantially insoluble, preferably completely insoluble, in the coating composition of the invention, and is used more particularly for increasing the volume. "Fillers" within the meaning of the present invention preferably differ from "pigments" in their refractive index, which for fillers is <1.7. Any customary filler known to the skilled person may be used as component (D3). Examples of suitable fillers are kaolin, dolomite, calcite, chalk, calcium sulfate, barium sulfate, graphite, silicates such as magnesium silicates, more particularly corresponding phyllosilicates such as hectorite, bentonite, montmorillonite, talc and/or mica, silicas, more particularly fumed silicas, hydroxides such as aluminum hydroxide or magnesium hydroxide, or organic fillers such as textile fibers, cellulose fibers, polyethylene fibers, or polymer powders; for further details refer to Römpp Lexikon Lacke und Druckfarben, Georg Thieme Verlag, 1998, pages 250 ff., "Fillers".

Copolymer of the Invention as Component (C)

The coating composition of the invention comprises the copolymer of the invention as component (C). The coating composition of the invention preferably comprises the copolymers (C), used as adhesion-promoting additive, in an amount in a range from 0.5 to 15 wt %, more preferably in an amount in a range from 1.0 to 10 wt %, very preferably in an amount in a range from 1.5 to 9 wt %, more particularly in an amount in a range from 2.0 to 8 wt %, based in each case on the total solids fraction of the coating composition.

The coating composition of the invention comprises preferably

- the at least one polymeric resin (A1) in an amount in a range from 7.5 to 30 wt %, based on the total weight of the coating composition,
- the optionally present at least one crosslinking agent (A2) in an amount in a range from 2.5 to 15 wt %, based on the total weight of the coating composition, and
- the at least one pigment (B) in an amount in a range from 0.5 to 20 wt %, based on the total weight of the coating composition,
- where the amounts of the water, (A1), (B), and (C) components present in the coating composition, and also, optionally, of at least one further component (D) and/or (A2) present therein, and/or of organic solvents optionally present therein, add up to a total of 100 wt %,
- more particularly when the at least one copolymer (C) used as adhesion-promoting additive is present in an amount in a range from 0.5 to 15 wt %, based on the total solids fraction of the coating composition.

Method for Producing the Coating Composition of the Invention

A further subject of the present invention is a method for producing the coating composition of the invention.

The method of the invention comprises at least the step of mixing of the water, (A1), optionally (A2), (B), and (C) components and optionally of further components such as (D) and/or organic solvents.

In terms of its methodology, the preparation of the coating composition of the invention has no peculiarities, but instead takes place in accordance with the customary and known techniques. The step of mixing in the method of the invention is carried out preferably by means of a high-speed stirrer, stirred tank, or dissolver, such as an in-line dissolver, for example.

Use of the Coating Composition of the Invention

A further subject of the present invention is a use of the coating composition of the invention for at least partly coating a substrate with a basecoat.

All preferred embodiments described hereinabove in connection with the coating composition of the invention and with the copolymer of the invention used as an adhesion-promoting additive are also preferred embodiments of the coating composition of the invention in respect of its use for at least partly coating a substrate with a basecoat.

At Least Partly Coated Substrate

A further subject of the present invention is a substrate coated at least partly with the coating composition of the invention. Substrates used are preferably the plastics substrates already identified above, in other words substrates composed of or based on at least one plastic.

The at least partly coated substrates are suitable for the esthetically and technically demanding field of vehicle finishing, more particularly of automobile finishing. The at least partly coated substrates such as plastics substrates, particularly the substrates—such as plastics substrates—at least partly coated with a multicoat paint system obtained in accordance with the method of the invention, can be used as vehicle parts and components for mounting in or on vehicles, and vehicle accessory parts, for both the interior and the exterior of vehicles. In addition to outstanding adhesion of the coatings and multicoat paint systems produced, a good and variable decorative effect can be achieved.

Method for at Least Partly Coating a Substrate with a Basecoat

A further subject of the present invention is a method for at least partly coating a substrate with a basecoat, comprising at least a step (1) of (1) at least partly contacting the substrate with the coating composition of the invention.

All preferred embodiments described hereinabove in connection with the coating composition of the invention and with the copolymer of the invention used as an adhesion-promoting additive are also preferred embodiments of the coating composition of the invention in respect of its employment in the method of the invention for at least partly coating a substrate with a basecoat.

The application of the aqueous coating composition of the invention to a substrate such as a plastics substrate, i.e., the contacting as per step (1), may take place by all customary application techniques, such as spraying, knifecoating, spreading, pouring, dipping, impregnating, trickling, or rolling, for example, preferably by spray application. At application, the substrate to be coated may itself be at rest, with the application device or unit being moved. Alternatively, the substrate to be coated may be moved, with the application unit being at rest relative to the substrate or being moved appropriately. Spray application techniques are employed with preference, such as, for example, compressed air spraying (pneumatic application), airless spraying, high-speed rotation, electrostatic spray application (ESTA), optionally in conjunction with hot spray application such as hot-air hot spraying, for example.

The aqueous coating composition of the invention is applied in the customary and known film thicknesses, as for example in wet film thicknesses of 10 to 200 micrometers, preferably of 50 to 150 micrometers. The resultant dry film thicknesses after curing are then, for example, in the range from 2 to 40 micrometers, more particularly 5 to 20 micrometers.

A further subject of the present invention is a basecoat obtainable by the method of the invention.

Method for at Least Partly Coating a Substrate with a Multicoat Paint System

A further subject of the present invention is a method for at least partly coating a substrate with a multicoat paint system, comprising at least the steps of (1) at least partly contacting the substrate with the coating composition as claimed in any of claims 7 to 10, for at least partly applying a basecoat to the substrate, and
(2) applying a further coat, preferably a clearcoat, to the basecoat applied by step (1).

All preferred embodiments described hereinabove in connection with the coating composition of the invention and with the copolymer of the invention used as an adhesion-promoting additive are also preferred embodiments of the coating composition of the invention in respect of its employment in the method of the invention for at least partly coating a substrate with a multicoat paint system.

A further coat is customarily applied to the basecoat applied as per step (1), this further coat being more particularly a clearcoat. The basecoat is preferably dried before the clearcoat material is applied as per step (2). The term "drying" refers, in the context of the present invention, preferably to the removal of solvent from the applied coating material. Depending on the nature of the binder, of course, there may already be crosslinking reactions occurring at this stage. Crosslinking, however, is not yet complete. In other words, the result of this step is not a fully cured coating film. Drying may take place initially at room temperature (20 to 23° C.) for 5 to 30, preferably 10 to 20, minutes, and subsequently at temperatures of 30 to 90° C., more particularly 50 to 80° C., again for 5 to 30, preferably 10 to 20, minutes.

A clearcoat material, as is known, is a coating material which, following application and curing, forms a transparent coating (the clearcoat) having protective and/or decorative properties. Protective properties mean, for example, scratch resistance and weathering resistance, more particularly UV resistance. An example of what is understood as a decorative property is good gloss. The clearcoat materials to be used are the clearcoat materials customarily used in the field of the finishing of plastics, and their selection and use are known to the skilled person (in this regard, see also Römpp-Lexikon Lacke und Druckfarben, Georg Thieme Verlag, Stuttgart, N.Y., 1998, page 325).

The general techniques for applying the clearcoat material are in line with those described earlier on above for the basecoat material. The clearcoat material is applied in the customary and known film thicknesses, as for example in wet film thicknesses of 50 to 250 micrometers, preferably of 100 to 180 micrometers. The resultant dry film thicknesses after curing are then, for example, in the range from 15 to 80 micrometers, more particularly 25 to 50 micrometers.

The curing of basecoat (applied as per step (1)) and clearcoat (applied as per step (2)) takes place preferably jointly. It has no peculiarities in terms of methodology, but instead takes place in accordance with the customary and known techniques such as, for example, heating in a forced air oven or by irradiation with IR lamps. Also possible is actinic curing by means of UV radiation, for example, in the case of radiation-curing systems. The curing conditions, particularly the curing temperatures, are guided, for example, by the temperature sensitivity of the substrates used or by the choice of the binders employed. Hence curing may take place, for example, in the range of room temperature (20 to 23° C.) or else at elevated temperatures in the range of, for example, 40° C. to 120° C., preferably of 60° C. to 90° C. The duration of the curing phase as well is selected individually and is dependent on factors including those already specified (for example, choice of binders and/or of curing temperatures). For example, curing may take place over a period of 5 to 120 minutes, preferably 10 minutes to 40 minutes. Curing may optionally also be preceded by a flashing phase or preliminary drying phase, at room temperature for a duration of 1 to 60 minutes, for example. Which curing conditions are to be employed with which substrates and/or coating compositions is part of the general art knowledge in the field, and so the skilled person is able to select and adapt the conditions.

A further subject of the present invention is a multicoat paint system obtainable by the method of the invention.

Methods of Determination

1. Determination of Nonvolatile Fraction:

The nonvolatile fraction (solids fraction) is determined according to DIN EN ISO 3251 (date: 1 Jun. 2008). It involves weighing out 1 g of sample into an aluminum boat which has been dried beforehand, and drying the sample in a drying oven at 130° C. for 60 minutes, cooling it in a desiccator, and then weighing it again. The residue, based on the total amount of sample used, corresponds to the nonvolatile fraction.

2. Determination of Acid Number:

The acid number is determined according to DIN EN ISO 2114 (date: June 2002), employing "Method A". The reported acid number corresponds here to the total acid number specified in the DIN standard. The free acids present in the sample are titrated with a potassium hydroxide standard solution in the presence of a color indicator. The acid number corresponds to the mass of potassium hydroxide in mg that is needed to neutralize 1 g of the compound under analysis, under the conditions specified in DIN EN ISO 2114.

3. Determination of OH Number (Hydroxyl Number):

The OH number is determined according to DIN 53240-2 (date: November 2007). The OH groups are reacted by acetylation with an excess of acetic anhydride. The excess acetic anhydride is subsequently reacted by addition of water to form acetic acid, and the entire acetic acid is back-titrated with ethanolic KOH. The OH number indicates the amount of KOH in mg that is equivalent to the amount of acetic acid bound in the acetylation of 1 g of the compound under analysis.

4. Determination of Number-average and Weight-average Molecular Weight:

The number-average ($M_n$) and weight-average ($M_w$) molecular weights are determined by means of gel permeation chromatograpy (GPC) with tetrahydrofuran as eluent and using a polystyrene standard and is based on DIN 55672-1 (date: August 2007). A styrene-divinylbenzene copolymer is used as column material. This method can be used to determine the polydispersity (ratio of weight-average molecular weight ($M_w$) to number-average molecular weight ($M_n$)).

5. Determination of Adhesion

The adhesion between a basecoat applied to the substrate employed (the basecoat being obtainable by application of the inventive coating composition or a comparative coating composition to a substrate) and the substrate itself may be determined and evaluated by means of the method described below.

A steam jet test is carried out according to DIN EN ISO 55662 (date: December 2009). This is followed by an evaluation using a rating system.

A jet of steam is directed for 1 minute at a temperature of 60° C. and at 67 bar from a distance of 10 cm perpendicularly onto the coated substrate under investigation. The adhesion is then evaluated by way of a rating system with ratings of 0 to 5, with the rating 0 being awarded for coatings which exhibit no visible traces after the steam jet treatment (very good adhesion), and the rating of 5 being awarded to coatings which after the steam jet test showed significantly detached regions (inadequate adhesion).

Before the steam jet test according to DIN EN ISO 55662 is carried out, the coated substrate under investigation may optionally be subjected to weathering in a conditioning chamber, i.e., to storage under constant humidity conditions according to DIN EN ISO 6270-2 CH; date: September 2005). The coated substrates under investigation are in this case stored in the conditioning chamber for 10 days at 100% humidity and 40° C. The adhesion of the specimens 24 hours after removal from the conditioning chamber is then investigated by means of the above-described steam jet test, after which the adhesion is evaluated by means of the above-described rating system.

The inventive and comparative examples below serve to illustrate the invention, but should not be interpreted as imposing any restriction.

INVENTIVE AND COMPARATIVE EXAMPLES

Unless otherwise indicated, the data in parts are parts by weight and the data in percent are in each case percentages by weight.

1. Preparation of Inventive Coating Compositions and Comparative Coating Compositions
1.1 Preparation of Inventive Copolymers
Copolymer 1

Copolymer 1 is prepared starting from the components specified in Table 1 below.

TABLE 1

| Item | Components used to prepare copolymer 1 | Parts by weight |
|---|---|---|
| 1 | Methyl ethyl ketone (MEK) | 47.31 |
| 2 | Initiator 1: | |
|   | Tert-butyl peroxy-2-ethylhexanoate (TBPEH) | 3.23 |
| 3 | Monomers 1: | |
|   | n-Butyl acrylate | 6.65 |
|   | Styrene | 8.40 |
|   | 2-Hydroxyethyl acrylate | 5.38 |
|   | Acrylic acid | 1.08 |
| 4 | Initiator 2: | |
|   | Tert-butyl peroxy-2-ethylhexanoate (TBPEH) | 3.23 |
| 5 | Monomers 2: | |
|   | n-Butyl acrylate | 8.73 |
|   | Styrene | 9.12 |
|   | Misch1 | 4.30 |
|   | C17A | 2.15 |
|   | Acrylic acid | 0.43 |
| 6 | Dimethylethanolamine | 0.63 |
| 7 | n-Butyl glycol | 5.98 |
| 8 | Deionized water | 53.87 |

Misch1 is a monomer mixture available commercially from BASF and containing 25 wt % ureidomethyl methacrylate (UMA) and 75 wt % methyl methacrylate. C17A is a monomer which has an acrylate group to which a branched $C_{17}$ alkyl radical is bonded.

Item 1 is charged to a reactor and heated to 75° C. At this temperature, the addition of items 2 and 3 is commenced. These items are metered in at uniform rate, item 3 over a duration of 2 hours and item 2 over a duration of 2.5 hours. After the end of the 2.5 hours, polymerization is continued for a duration of 30 minutes. Items 4 and 5 are then added to this mixture by metered addition at uniform rate, with item 5 being metered in over a duration of 2 hours, and item 4 over a duration of 2.5 hours. After the end of the 2.5 hours, polymerization is continued for a duration of 30 minutes.

The mixture obtained following addition of items 6 and 7 has a solids content of 49.5 wt %, an acid number of 22.3 mg of KOH per g of solids in this mixture, and an OH number of 54 mg of KOH per g of solids in this mixture. Addition of item 8 gives an aqueous dispersion having a pH of 9.1 and a solids content of 24.6 wt %. The copolymer 1 present in the aqueous dispersion has a number-average molecular weight of 4639 g/mol and a weight-average molecular weight of 18 590 g/mol.

The resulting aqueous dispersion of copolymer 1 is used as described in section 1.3 below.
Copolymer 2

Copolymer 2 is prepared starting from the components specified in Table 2 below.

Sipomer WAM II is a methacryloylamidoethylethyleneurea, a commercially available monomer from Rhodia.

TABLE 2

| Item | Components used to prepare copolymer 2 | Parts by weight |
|---|---|---|
| 1 | Methyl ethyl ketone (MEK) | 48.89 |
| 2 | Initiator 1: | |
|   | Tert-butyl peroxy-2-ethylhexanoate (TBPEH) | 3.33 |
| 3 | Monomers 1: | |
|   | n-Butyl acrylate | 6.87 |
|   | Styrene | 8.68 |
|   | 2-Hydroxyethyl acrylate | 5.56 |
|   | Acrylic acid | 1.11 |
| 4 | Initiator 2: | |
|   | Tert-butyl peroxy-2-ethylhexanoate (TBPEH) | 3.33 |
| 5 | Monomers 2: | |
|   | n-Butyl acrylate | 10.13 |
|   | Styrene | 9.43 |
|   | Sipomer WAM II | 1.11 |
|   | C17A | 1.11 |
|   | Acrylic acid | 0.44 |
| 6 | Dimethylethanolamine | 0.63 |
| 7 | n-Butyl glycol | 5.98 |
| 8 | Deionized water | 53.87 |

Item 1 is charged to a reactor and heated to 75° C. At this temperature, the addition of items 2 and 3 is commenced. These items are metered in at uniform rate, item 3 over a duration of 2 hours and item 2 over a duration of 2.5 hours. After the end of the 2.5 hours, polymerization is continued for a duration of 30 minutes. Items 4 and 5 are then added to this mixture by metered addition at uniform rate, with item 5 being metered in over a duration of 2 hours, and item 4 over a duration of 2.5 hours. After the end of the 2.5 hours, polymerization is continued for a duration of 30 minutes.

The mixture obtained following addition of items 6 and 7 has a solids content of 48.7 wt %, an acid number of 31.2 mg of KOH per g of solids in this mixture, and an OH number of 60 mg of KOH per g of solids in this mixture. Addition of item 8 gives an aqueous dispersion having a pH of 7.6 to 9.1 and a solids content of 23 to 28 wt %. The copolymer 2 present in the aqueous dispersion has a number-average molecular weight of 4071 g/mol and a weight-average molecular weight of 13 540 g/mol.

The resulting aqueous dispersion of copolymer 2 is used as described in section 1.3 below.
Copolymer 3

Copolymer 3 is prepared as for copolymer 1, with the difference that a monomer C13A is used instead of C17A. The monomer C13A is a monomer which has an acrylate group to which a branched $C_{13}$ alkyl radical is bonded.
1.2 Preparation of Noninventive Copolymers (Comparative Copolymers)

A total of two different noninventive copolymers (comparative copolymers) are prepared, VC1 and VC2.

The copolymers VC1 and VC2 are prepared as for copolymer 1, with the difference that instead of C17A a monomer C9A is used in the case of VC1 and a monomer C16C18A is used in the case of VC2. The monomer C9A is a monomer which has an acrylate group to which a branched $C_9$ alkyl radical is bonded. The monomer C16C18A is a mixture of two monomers which each have an acrylate group to which either a linear (unbranched) $C_{16}$ alkyl radical or a linear (unbranched) $C_{18}$ alkyl radical is bonded.
1.3 Preparation of Inventive Coating Compositions The aqueous dispersion comprising the inventive copolymer 1, the aqueous dispersion comprising the inventive copolymer 2, and the aqueous dispersion comprising the inventive copolymer 3 are each used to prepare inventive aqueous coating compositions, which are in each case suitable for producing a basecoat on a substrate.

First of all, a total of three aqueous basecoat materials, 1, 2, and 3, are prepared using the components stated in Table 3 below, in the sequence indicated in Table 3. The figure in wt % in connection with each of the components is based in each case on the total weight of the respective aqueous basecoat material 1, 2, or 3.

Laponite RD is a commercial thixotropic agent. Pluriol P900 is a commercial polyethylene glycol. Viscalex HV 30 is a commercial rheological assistant. Foamstar MF324 is a commercial defoamer. Cymel 327 and 1133 are commercial melamine-formaldehyde resins. Pigment paste 1 is a 10% (wt %) dispersion of the carbon black pigment Monarch 1400 in water. Pigment paste 2 is a 50% (50 wt %) dispersion of the rutile titanium pigment Titanrutil 2310 in water. Pigment paste 3 is a polyacrylate-based blue tinting paste. Pigment paste 4 is a polyacrylate-based white tinting paste. Pigment paste 5 is a polyester-based black tinting paste. Pigment paste 6 is a polyacrylate-based red tinting paste. As aluminum effect pigment, a dispersion with a solids content of 65 wt % is used. Dimethylethanolamine is used in the form of an aqueous solution (10% by weight in water). Parocryl VP 567750 is a commercial dispersion of an OH-functional acrylate resin in organic solvents.

TABLE 3

Preparation of aqueous basecoats 1 to 3:

| Components used to prepare basecoats 1 to 3 | Amount of basecoat 1 [wt %] | Amount of basecoat 2 [wt %] | Amount of basecoat 3 [wt %] |
|---|---|---|---|
| Laponite RD | 19.20 | 32.99 | 19.72 |
| Water | 9.82 | 13.68 | 18.21 |
| Commercial dispersion of an OH-functional polyurethane resin (water content: 66.0 wt %, organic solvents content: 6.3 wt %) | 32.96 | 15.09 | 17.21 |
| Commercial dispersion of an OH-functional polyester resin (water content: 17.7 wt %, organic solvents content: 20.0 wt %) | 3.17 | 7.70 | 5.60 |
| n-Butoxypropanol | 2.11 | — | — |
| n-Butyl glycol | — | 4.05 | 6.60 |
| Commercial melamine-formaldehyde resin (isobutyl-/methyl-etherified; 93 wt % solids content) | — | — | 4.58 |
| Cymel 327 | 4.40 | — | — |
| Cymel 1133 | — | 3.54 | — |
| TMDD BG 52 (commercial wetting agent) | 0.53 | — | — |
| TMDD BG 54 (commercial wetting agent) | — | 2.02 | — |
| Dimethylethanolamine | 1.58 | — | — |
| Commercial dispersion of an OH-functional acrylate resin (water content: 49.5 wt %, organic solvents content: 13.0 wt %) | 5.38 | — | — |
| Parocryl VP 567750 | — | 5.17 | 4.40 |
| Foamstar MF324 | 0.53 | — | — |
| Ethylhexanol | 4.22 | — | 1.56 |
| BYK 347 (commercial wetting agent) | 0.53 | — | — |
| BYK 346 (commercial wetting agent) | — | — | 0.66 |
| Pluriol P900 | 2.11 | 1.01 | 1.79 |
| Isopropanol | 2.32 | — | — |
| Viscalex HV 30 | 0.42 | 4.00 | — |
| Pigment paste 1 | 10.68 | — | — |
| Pigment paste 2 | 0.04 | — | — |
| Pigment paste 3 | — | 0.04 | — |
| Pigment paste 4 | — | 0.20 | — |
| Pigment paste 5 | — | — | 0.89 |
| Pigment paste 6 | — | — | 13.30 |
| Aluminum effect pigment | — | 5.43 | — |
| Dipropylene glycol methyl ether | — | 5.08 | — |
| Red pigment | — | — | 3.02 |
| Mica effect pigment | — | — | 2.46 |

Coating Compositions B1a-C1, B1b-C1 and B1c-C1

The inventive coating compositions B1a-C1, B1b-C1 and B1c-C1 are prepared by adding 2.5 (B1a), 5 (B1b) or 7.5 (B1c) wt % of copolymer 1 to the aqueous basecoat material 1, based in each case on the total solids content of the aqueous basecoat material 1, and stirring the resulting mixture with a laboratory stirrer (260-1820 rpm). The amount of 2.5, 5 or 7.5 wt % of copolymer 1 relates in each case to the copolymer as such, i.e., it is based on the solids content of the copolymer 1 in the aqueous dispersion comprising the copolymer 1, which is obtained as described in section 1.1.

Coating Compositions B1a-C2, B1b-C2 and B1c-C2

The inventive coating compositions B1a-C2, B1b-C2 and B1c-C2 are prepared by adding 2.5 (B1a), 5 (B1b) or 7.5 (B1c) wt % of copolymer 2 to the aqueous basecoat material 1, based in each case on the total solids content of the aqueous basecoat material 1, and stirring the resulting mixture with a laboratory stirrer (260-1820 rpm). The amount of 2.5, 5 or 7.5 wt % of copolymer 2 relates in each case to the copolymer as such, i.e., it is based on the solids content of the copolymer 2 in the aqueous dispersion comprising the copolymer 2, which is obtained as described in section 1.1.

Coating Compositions B2-C1 and B3-C1 and Also B2-C2 and B3-C2

The inventive coating compositions B2-C1 and B3-C1 are prepared by adding 5 wt % of copolymer 1 to the aqueous basecoat material 2, based in each case on the total solids content of the aqueous basecoat material 2, and stirring the resulting mixture with a laboratory stirrer (260-1820 rpm). The inventive coating compositions B2-C2 and B3-C2 are prepared by adding 5 wt % of copolymer 2 to the aqueous basecoat material 3, based in each case on the total solids content of the aqueous basecoat material 3, and stirring the resulting mixture with a laboratory stirrer (260-1820 rpm). The amount of 5 wt % of copolymer 1 or copolymer 2 relates in each case to the copolymer as such, i.e., it is based on the solids content of the copolymer 1 or 2 in the aqueous dispersion comprising the copolymer 1 or 2, which is obtained as described in section 1.1.

Coating Composition B1-C3

The inventive coating composition B1-C3 is prepared by adding 5 wt % of copolymer 3 to the aqueous basecoat material 1, based in each case on the total solids content of the aqueous basecoat material 1, and stirring the resulting mixture with a laboratory stirrer (260-1820 rpm).

1.4 Preparation of Comparative Coating Compositions V1 and V2 and V3

As comparative coating compositions V1, V2, and V3, use is made in each case of the (unadditized) aqueous basecoat material 1 (V1), aqueous basecoat material 2 (V2), and aqueous basecoat material 3 (V3)—in other words, in each case, a basecoat material of this kind that contains no inventively employed copolymer.

V4a and V4b

Two comparative coating compositions V4a and V4b are prepared by adding 5 wt % of comparative copolymer VC1 (V4a) or of comparative copolymer VC2 (V4b) to the aqueous basecoat material 1, based in each case on the total solids content of the aqueous basecoat material 1, and stirring the resulting mixture with a laboratory stirrer (260-1820 rpm).

V5a and V5b

Two comparative coating compositions V5a and V5b are prepared by adding 2.5 (V5a) or 5.0 (V5b) wt % of a commercially available adhesion promoter (Hardlen NA 3002 from Toyobo) to the aqueous basecoat material 1, based in each case on the total solids content of the aqueous basecoat material 1, and stirring the resulting mixture with a laboratory stirrer (260-1820 rpm). The amount of commercially available adhesion promoter is based on the solids content of the commercially available adhesion promoter. Hardlen NA 3002 from Toyobo is a chlorinated polyolefin.

V6a and V6b

Two comparative coating compositions V6a and V6b are prepared by adding 1.0 (V6a) or 2.0 (V6b) wt % of a commercially available adhesion promoter (Byk 4500 from BYK Chemie) to the aqueous basecoat material 1, based in each case on the total solids content of the aqueous basecoat material 1, and stirring the resulting mixture with a laboratory stirrer (260-1820 rpm). The amount of commercially available adhesion promoter is based on the solids content of the commercially available adhesion promoter.

2. Production of Coated Substrates Using One of the Inventive Coating Compositions or a Comparative Coating Composition Substrates employed are various plastic substrates, in each case in the form of test plates with an area of 10 cm×10 cm×0.3 cm. The plastics substrates used are substrates of polypropylene (PP) (substrate T1) or of polypropylene modified with ethylene-propylene-diene copolymer (PP-EPDM) (substrate T2). The substrates are subjected to flaming over a duration of 2 seconds.

Applied pneumatically to the respective substrate employed is an inventive coating composition B1a-C1, B1b-C1, B1c-C1, B1a-C2, B1b-C2, B1c-C2, B2-C1, B3-C1, B2-C2 or B3-C2 or B1-C3, or one of the comparative coating compositions V1, V2, V3, V4a, V4b, V5a or V5b, or V6a or V6b. The respective basecoat thus applied is dried at room temperature (20-23° C.) for 10 minutes and then at 80° C. for a further 10 minutes in a forced air oven (oven temperature) (intermediate drying).

A clearcoat material is subsequently applied to each of the resulting plastics substrates coated with a basecoat. The composition of the clearcoat material used in each case is reproduced in Table 4 below. This is followed by the joint curing of the applied aqueous basecoat material and of the applied clearcoat material at room temperature (20-23° C.) for 10 minutes and then at 80° C. for 30 minutes in a forced-air oven (oven temperature). The basecoat has a dry film thickness of 15 μm in each case, and the clearcoat has a dry film thickness of 35 μm.

TABLE 4

| Components used for preparing the clearcoat | |
|---|---|
| Components used for preparing the clearcoat | Amount [wt %] |
| Parocryl AC 30.3 (solvent-containing acrylate resin) | 50.93 |
| Setal 82166 SS-55 | 25.51 |
| Cyclohexanone | 3.91 |
| Solvent Naphtha 230/290 | 1.95 |
| Parocryl AC 30.3 (solvent-containing acrylate resin) | 9.78 |
| Disolucion de Silicona F-2 | 1.54 |
| Flow control agent (5% strength solution of Baysilon OL44) | 0.49 |
| Tinuvin 292 (commercial light stabilizer) | 0.93 |
| Tinuvin 1130 (commercial UV absorber) | 0.93 |
| Catalyst (1% strength solution of dibutyltin dilaurate) | 0.59 |
| Cumyl hydroperoxide (80% strength) | 0.39 |
| 1-Methoxyprop-2-yl acetate | 3.05 |

The figure in wt % in Table 4 in connection with each of the components is based in each case on the total weight of the clearcoat material.

Obtained accordingly are the substrates T1 coated with one of the coating compositions B1a-C1, B1b-C1, B1c-C1, B1a-C2, B1b-C2, B1c-C2, B2-C1, B3-C1, B2-C2, B3-C2, B1-C3, V1, V2, V3, V4a, V4b, V5a or V5b, and V6a or V6b, and also of the clearcoat (coated substrates T1-B1a-C1, T1-B1b-C1, T1-B1c-C1, T1-B1a-C2, T1-B1b-C2, T1-B1c-C2, T1-B2-C1, T1-B3-C1, T1-B2-C2 and T1-B3-C2 and T1-B1-C3, and also T1-V1, T1-V2 and T1-V3 and also T1-V4a, T1-V4b, T1-V5a and T1-V5b, and also T1-V6a and T1-V6b).

Obtained also are the substrates T2 coated with one of the coating compositions B1a-C1, B1b-C1, B1c-C1, B1a-C2, B1b-C2, B1c-C2, B2-C1, B3-C1, B2-C2, B3-C2, B1-C3, V1, V2, V3, V4a, V4b, V5a or V5b, and with the clearcoat (coated substrates T2-B1a-C1, T2-B1b-C1, T2-B1c-C1, T2-B1a-C2, T2-B1b-C2, T2-B1c-C2, T2-B2-C1, T2-B3-C1, T2-B2-C2 and T2-B3-C2 and T2-B1-C3, and also T2-V1, T2-V2 and T2-V3, and also T2-V4a, T2-V4b, T2-V5a and T2-V5b).

A total of 6 samples of each of the different coated substrates are produced, and each sample is investigated individually as described in section 3. below. Subsequently the respective average is formed.

3. Investigation of Adhesion Properties of Coated Substrates 3.1 The adhesion between the basecoat applied in each case to the substrate employed, and the substrate itself is determined and evaluated by means of the above-described method (without prior storage of the respective coated substrate under constant humidity conditions) for the coated substrates identified in Table 5.

Table 5 summarizes the results.

As is apparent from Table 5, by using the inventive copolymer 1 or 2 or 3 in the coating composition used for producing a basecoat, a significant improvement can be obtained in the adhesion to the respective substrate T1 or T2.

From comparative examples T2-V4a and T2-V4b in particular it is evident that the adhesion-promoting effect of a comparative copolymer whose structural unit (S1) has a linear alkyl group having at least 11 carbon atoms or has an alkyl group which, though branched, has fewer than 11 carbon atoms is inadequate.

TABLE 5

| Coated substrate | Evaluation of adhesion between basecoat and substrate |
|---|---|
| T1-V1 (comparative) | 4 |
| T1-B1a-C1 | 0.5 |
| T1-B1b-C1 | 0 |
| T1-B1c-C1 | 0 |
| T1-B1a-C2 | 0.5 |
| T1-B1b-C2 | 0 |
| T1-B1c-C2 | 0 |
| T1-B1-C3 | 1 |
| T2-V1 (comparative) | 5 |
| T2-V4a (comparative) | 4.5 |
| T2-V4b (comparative) | 3.5 |
| T2-B1a-C1 | 0 |
| T2-B1b-C1 | 0.5 |
| T2-B1c-C1 | 0 |
| T2-B1a-C2 | 0 |
| T2-B1b-C2 | 0 |
| T2-B1c-C2 | 0.5 |
| T2-B1-C3 | 2.5 |
| T1-V2 (comparative) | 3 |
| T1-B2-C1 | 0.5 |
| T1-B2-C2 | 0.5 |
| T1-V3 (comparative) | 4 |
| T1-B3-C1 | 0 |
| T1-B3-C2 | 0 |
| T2-V2 (comparative) | 4 |
| T2-B2-C1 | 0.5 |
| T2-B2-C2 | 0 |
| T2-V3 (comparative) | 4 |
| T2-B3-C1 | 0.5 |
| T2-B3-C2 | 0 |

3.2 The adhesion between the basecoat applied in each case to the substrate employed, and the substrate itself is also determined and evaluated by means of the above-described method including prior storage of the respective coated substrate under the above-described constant humidity conditions according to DIN EN ISO 6270-2 CH (date: September 2005) for the coated substrates identified in Table 6.

Table 6 summarizes the results.

TABLE 6

| Coated substrate | Evaluation of adhesion between basecoat and substrate |
|---|---|
| T1-V1 (comparative) | 3 |
| T1-V6a (comparative) | 4 |
| T1-V6b (comparative) | 4 |
| T1-V5a (comparative) | 5 |
| T1-V5b (comparative) | 4 |
| T1-B1a-C1 | 0 |
| T1-B1b-C1 | 1 |
| T1-B1c-C1 | 0 |
| T1-B1b-C2 | 0 |
| T1-B1c-C2 | 1 |
| T2-V1 (comparative) | 3 |
| T2-V5a (comparative) | 0 |
| T2-V5b (comparative) | 0 |
| T2-B1a-C1 | 0 |
| T2-B1b-C1 | 0 |
| T2-B1c-C1 | 0 |
| T2-B1b-C2 | 1 |
| T2-B1c-C2 | 1 |

As is evident from Table 6, by using the inventive copolymer 1 or 2 in the coating composition used for producing a basecoat, a significant improvement can be obtained in the adhesion to the respective substrate T1 or T2. While effective adhesion to EPDM-PP (substrate T2) can also be achieved using the coating compositions V5a and V5b, these compositions, with the commercially available adhesion promoter Hardlen NA 3002, contain chlorinated polyolefins, which makes them undesirable on environmental grounds among others.

What is claimed is:

1. A copolymer obtained by copolymerization of at least three ethylenically unsaturated monomers each different from one another,
wherein
the copolymer has at least three structural units (S1), (S2), and (S3) each different from one another,
each structural unit (S1) has at least one branched alkyl group having at least 11 carbon atoms,
each structural unit (S2) has at least one urea group bonded via a $C_{1-10}$ alkylene group, of the formula (I):

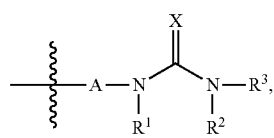

wherein:
X is O or S,
A is a $C_{1-10}$ alkylene group, and
$R^1$, $R^2$ and $R^3$ each independently of one another are H or a $C_{1-10}$ alkyl radical,
or
$R^1$ and $R^2$ together are $-(CR^4R^5)_n-$ and $R^3$ is H or a $C_{1-10}$ alkyl radical, where $R^4$ and $R^5$ each independently of one another are H or a $C_{1-6}$ alkyl radical, and n is an integer from 2 to 5, and
each structural unit (S3) has at least one functional group selected from the group consisting of a carboxyl group, hydroxyl group, thiol group, amino group, epoxide group, and a mixture thereof.

2. The copolymer of claim 1, wherein the structural units (S1), (S2), and (S3) are introduced into the copolymer by copolymerization of monomers which each independently of one another have at least one (meth)acryloyl group as an ethylenically unsaturated group.

3. The copolymer of claim 1,
wherein
each structural unit (S1) has at least one branched alkyl group having at least 13 carbon atoms,
each structural unit (S2) has at least one urea group bonded via a $C_{1-6}$ alkylene group, of the formula (I):

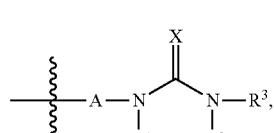

wherein:
X is O or S,
A is a $C_{1-6}$ alkylene group, and
$R^1$ and $R^2$ together are $-(CR^4R^5)_n-$ and $R^3$ is H or a $C_{1-6}$ alkyl radical, where $R^4$ and $R^5$ each independently of one another are H or a $C_{1-6}$ alkyl radical, and n is an integer from 2 to 5, and each structural unit (S3) has at least one functional group selected from the group consisting of a carboxyl group, hydroxyl group, and a mixture thereof.

4. The copolymer in of claim 1, wherein the copolymer has at least one further structural unit (S4) different from (S1), (S2), and (S3), wherein each structural unit (S4) has at least one group selected from the group consisting of a branched and unbranched $C_{1-10}$ alkyl group, a $C_{3-10}$ cycloalkyl group optionally substituted by at least one $C_{1-6}$ alkyl group, an aromatic group optionally substituted by at least one $C_{1-6}$ alkyl group, an aromatic group bonded via a $C_{1-6}$ alkylene group and optionally substituted by at least one $C_{1-6}$ alkyl group, and a $C_{3-10}$ cycloalkyl group bonded via a $C_{1-6}$ alkylene group and optionally substituted by at least one $C_{1-6}$ alkyl group.

5. The copolymer of claim 4, wherein the copolymer is obtained by radical copolymerization of
(s1) at least one ethylenically unsaturated monomer capable of forming the structural unit (S1), in an amount in a range from 0.5 to 15 mol %, based on the total amount in mol % of all monomers used for preparing the copolymer,
(s2) at least one ethylenically unsaturated monomer capable of forming the structural unit (S2), in an amount in a range from 0.5 to 15 mol %, based on the total amount in mol % of all monomers used for preparing the copolymer,
(s3) at least one ethylenically unsaturated monomer capable of forming the structural unit (S3), in an amount in a range from 5 to 50 mol %, based on the total amount in mol % of all monomers used for preparing the copolymer, and
(s4) at least one ethylenically unsaturated monomer capable of forming the structural unit (S4), in an amount in a range from 20 to 90 mol %, based on the total amount in mol % of all monomers used for preparing the copolymer,
with the total amount of all monomers (s1), (s2), (s3), and (s4) used for preparing the copolymer adding up in total to 100 mol %.

6. An aqueous coating composition for at least partly coating a substrate with a basecoat, the aqueous coating composition comprising:
at least one polymeric resin (A1) and optionally at least one crosslinking agent (A2),
at least one pigment (B), and
as a component (C), at least one copolymer as in claim 1, said copolymer is different from the polymeric resin (A1) and is used as adhesion-promoting additive.

7. The aqueous coating composition of claim 6, wherein the coating composition comprises from 0.5 to 15 wt % of the copolymer (C), based on the total solids fraction of the coating composition.

8. The aqueous coating composition of claim 6, wherein the polymeric resin (A1) is selected from the group consisting of a polyurethane, polyester, epoxy resin, poly(meth)acrylate, each having at least one functional hydroxyl group, and a mixture thereof, and the optionally present crosslinking agent (A2) comprises at least one optionally alkylated melamine-formaldehyde condensation product and/or at least one blocked polyisocyanate.

9. The aqueous coating composition of claim 6, wherein the coating composition comprises:
from 7.5 to 30 wt % of the at least one polymeric resin (A1), based on the total weight of the coating composition,
from 2.5 to 15 wt % of the at least one crosslinking agent (A2), based on the total weight of the coating composition, and
from 0.5 to 20 wt % of the at least one pigment (B), based on the total weight of the coating composition, and
wherein an amount of water, (A1), (A2), (B), and (C) components present in the coating composition, and of optionally present at least one of an additive (D) and an organic solvent add up in total to 100 wt %.

10. A method for at least partly coating a substrate with a basecoat, the method comprising:
at least partly contacting the substrate with the aqueous coating composition of claim 6.

11. A basecoat present at least partly on a substrate, obtained by the method of claim 10.

12. A substrate coated at least partly with an aqueous coating composition, obtained by the method of claim 10.

13. A method for at least partly coating a substrate with a multicoat paint system, the method comprising:
(1) at least partly contacting the substrate with the aqueous coating composition of claim 6 for at least partly forming a basecoat on the substrate, and
(2) applying a clearcoat to the basecoat formed in (1).

14. A multicoat paint system present at least partly on a substrate, obtained by the method of claim 13.

15. A substrate coated at least partly with a multicoat paint system, obtained by the method of claim 13.

16. A substrate coated at least partly with the aqueous coating composition of claim 6.

17. The method as claimed in claim 10, wherein the substrate comprises at least one plastic.

18. The substrate as claimed in claim 12, which comprises at least one plastic.

19. The method as claimed in claim 13, wherein the substrate comprises at least one plastic.

20. The substrate as claimed in claim 15, which comprises at least one plastic.

* * * * *

UNITED STATES PATENT AND TRADEMARK OFFICE
CERTIFICATE OF CORRECTION

PATENT NO. : 10,208,148 B2
APPLICATION NO. : 15/312415
DATED : February 19, 2019
INVENTOR(S) : Cathrin Corten et al.

Page 1 of 1

It is certified that error appears in the above-identified patent and that said Letters Patent is hereby corrected as shown below:

In the Specification

Column 13, Line 63, "polyamide" should read -- polyamides --;

Column 22, Line 21, "chromatograpy" should read -- chromatography --;

Column 24, Line 46, "a branched $C_1$" should read -- a branched $C_{13}$ --;

In the Claims

Column 31, Line 4, "copolymer in of claim 1" should read -- copolymer of claim 1 --.

Signed and Sealed this
First Day of October, 2019

Andrei Iancu
*Director of the United States Patent and Trademark Office*